United States Patent

Gorywoda et al.

(10) Patent No.: US 6,649,134 B2
(45) Date of Patent: Nov. 18, 2003

(54) METHOD AND APPARATUS FOR REDUCING NITROUS OXIDE

(75) Inventors: Marek Gorywoda, Hanau (DE); David Francis Lupton, Gelnhausen (DE); Jonathan Lund, Kelkheim (DE)

(73) Assignee: W. C. Heraeus GmbH & Co. KG, Hanau (DE)

( * ) Notice: Subject to any disclaimer, the term of this patent is extended or adjusted under 35 U.S.C. 154(b) by 162 days.

(21) Appl. No.: 10/018,771

(22) PCT Filed: May 10, 2001

(86) PCT No.: PCT/EP01/05297

§ 371 (c)(1),
(2), (4) Date: Dec. 17, 2001

(87) PCT Pub. No.: WO01/87771

PCT Pub. Date: Nov. 22, 2001

(65) Prior Publication Data

US 2003/0124046 A1 Jul. 3, 2003

(30) Foreign Application Priority Data

May 15, 2000 (DE) .......................................... 100 23 567

(51) Int. Cl.[7] .............................................. B01D 53/56
(52) U.S. Cl. ................... 423/239.1; 422/191; 422/211; 423/372; 423/390.1; 423/392; 423/403
(58) Field of Search ................................ 422/190, 191, 422/211; 423/235, 239.1, 372, 390.1, 392, 400, 403; 502/326

(56) References Cited

U.S. PATENT DOCUMENTS 3,873,675 A  3/1975  Roters ....................... 423/403
3,915,898 A  10/1975  Acres et al. ................ 252/470
4,973,457 A  * 11/1990  Kongshaug et al. ........ 423/235

FOREIGN PATENT DOCUMENTS

| DE | 1 959 137 | 5/1971 |
|---|---|---|
| DE | 2 239 514 | 2/1973 |
| DE | 198 05 202 | 2/1999 |
| DE | 198 19 882 | 10/1999 |
| EP | 359 286 | 3/1990 |
| EP | 611 041 | 8/1994 |

OTHER PUBLICATIONS

Article entitled "Lehrbuch der Anorganischen Chemie" by Holleman appearling in Walter de Gruyter & Co., Berlin 1971, p. 360.

* cited by examiner

*Primary Examiner*—Stanley S. Silverman
*Assistant Examiner*—Maribel Medina
(74) *Attorney, Agent, or Firm*—Ostrolenk Faber Gerb & Soffen

(57) ABSTRACT

A process and a device for reducing the nitrous oxide which is formed during the catalytic combustion of ammonia and oxygen to form nitrogen oxides. A catalyst system including at least one first catalyst mesh element and at least one second catalyst mesh element is used for the catalytic combustion of ammonia and oxygen to form nitrogen oxides, where the minimum of one first catalyst mesh element is a platinum-rhodium mesh and the minimum of one second, downstream catalyst mesh element is a palladium-rhodium mesh with 2–4 wt. % of rhodium.

14 Claims, No Drawings

METHOD AND APPARATUS FOR REDUCING NITROUS OXIDE

BACKGROUND OF THE INVENTION

The invention pertains to a process and to a device for reducing the nitrous oxide which is formed during the catalytic combustion of ammonia and oxygen to form nitrogen oxides, where a catalyst system consisting of at least one first catalyst mesh element and at least a second catalyst mesh element is used for the catalytic combustion of ammonia and oxygen to form nitrogen oxides, and where at least one first catalyst mesh element is a platinum-rhodium mesh element.

A familiar problem in the production of nitric acid by the combustion of ammonia with oxygen to form suitable nitrogen oxides is the fact that nitrous oxide (laughing gas) is also formed, which is under suspicion of contributing to the destruction of the earth's ozone layer. In the production of nitric acid, therefore, it is extremely important to effectively destroy the $N_2O$ which has formed or to prevent nitrous oxide from being formed as completely as possible in the first place. The attempt to achieve these ends should not impair the yield of the desired nitrogen oxides.

DE 198-19,882 A1 discloses a process for the catalytic decomposition of the $N_2O$ present in a gas mixture obtained during the production of nitric acid by the catalytic oxidation of ammonia. This process makes use of a catalyst for the decomposition of $N_2O$ and is characterized in that the hot gas mixture obtained from the catalytic oxidation of ammonia is brought into contact with the $N_2O$-decomposing catalyst before the mixture is cooled.

DE-OS 2,239,514 discloses an arrangement of catalyst gauze strips for accelerating the reaction between two or more gases flowing through the gauze. On the downward-directed flow side of a group of gauze strips of precious metal material, a second group of gauze strips consisting of non-precious metal material, relatively difficult-to-vaporize metal material, and metal material which can be carried away by the gases is provided. The second group supports the acceleration of the reaction during the operation of the system.

DE-OS 1,959,137 discloses a catalyst with a reduced platinum and rhodium content of 12–20 wt. % for the oxidation of ammonia to nitrogen oxide.

In Hollemann-Wiberg, *Lehrbuch der anorganischen Chemie* [*Textbook of Organic Chemistry*], 71-b 80$^{th}$ edition, Verlag Walter de Gruyter & Co., Berlin, 1971, p. 360, an ammonia combustion element for recovering nitrogen oxide with a platinum mesh catalyst and larger systems with several stacked wire mesh elements per combustion element are described.

EP 0,359,286 B1 describes a process for reducing the nitrous oxide which is formed during the catalytic combustion of ammonia and oxygen to form nitrogen oxides. The nitrous oxide is cooled in a heat recovery unit and then absorbed in water and/or dilute nitric acid. The process is characterized in that the hot combustion gases are given a retention time of 0.1–3 seconds before they are cooled. In this way, it is possible to decompose up to 90% of the $N_2O$ which has formed.

EP 0,611,041 B1 discloses a process for reducing the $N_2O$ emissions during the startup phase of an ammonia oxidation reaction. A catalyst mesh based on platinum is used together with a platinum collector mesh element, which comprises fibers of a palladium alloy, said palladium alloy containing 0.1–5 wt. % of cobalt.

DE 198-05,202 A1 describes a process for the production of nitric acid in which ammonia is burned on at least one catalyst mesh element, especially on a platinum mesh element, as oxygen is being supplied. The reaction gases are then cooled. Before the reaction gases are cooled downstream of the catalyst mesh, they are conducted over a heat-resistant catalyst to convert the $N_2O$ contained in the reaction gases.

The processes indicated above either have unsatisfactory $N_2O$ decomposition rates or require a very complicated apparatus, which must be considered disadvantageous in an economic sense.

SUMMARY AND DESCRIPTION OF THE INVENTION

The problem is therefore to find a novel method and a novel device for reducing nitrous oxide while avoiding at least some of the disadvantages listed above and especially to provide an efficient process and a corresponding device which are low in cost in terms of the required apparatus.

Both in the process according to the invention and in the corresponding device according to the invention, ammonia is mixed with oxygen and burned at a temperature of approximately 860° C by passing it quickly over a first catalyst mesh element, which consists of platinum-rhodium mesh typically containing 5.0–10.0 wt. % of rhodium, and then by passing it quickly over a second catalyst mesh element, this second catalyst consisting of palladium-rhodium mesh with at least 92 wt. % (or more) of palladium, 2–4 wt. % of rhodium, and the remainder of platinum or alternatively of 82–83 wt. % of palladium, 2.5–3.5 wt. % of rhodium, and the remainder of platinum, as a result of which the proportion of nitrous oxide is reduced in a highly efficient manner. The mesh used here is a gas-permeable structure which is essentially metallic and which is produced by, for example, knotting, knitting, weaving, or the random laying of fibers.

The surprising result was obtained that, through the simultaneous use of the two catalyst mesh elements according to the invention, the proportion of $N_2O$ that forms could be decreased significantly right from the start, and simultaneously NO could be produced in a highly efficient manner.

It is advantageous, first, for the palladium-rhodium mesh to have a rhodium content of 2.5–3 wt. % and a palladium content of 82.5%, because in this way an especially low level of $N_2O$ formation can be reached.

It is also advantageous for the palladium-rhodium mesh element to be separated from the platinum-rhodium mesh element by least one third mesh element, so that in this way it is possible to prevent the different types of mesh elements from becoming welded together. As material for the third mesh element, a heat-resisting steel (FeCrAl alloy, e.g., Megapyr or Kanthal) has been found to give good results.

Finally, it can be advantageous for the palladium-rhodium mesh to contain an additional metal from the group consisting of iridium, ruthenium, rhenium, cobalt, nickel, copper, and gold to increase the mechanical stability of the palladium-rhodium catalyst mesh elements without interfering with their catalytic function.

EXAMPLES

The following examples are presented to explain the invention in greater detail.

1. Experiments in the Test Reactor

| System Data: | |
|---|---|
| reactor: | test reactor with an effective diameter of 100 mm; |
| reactor pressure: | 5 bars; |
| load: | 10 tN/m$^2$day; |
| temperature: | 865° C.; |
| running time: | 20 days. |
| Example 1 (Standard System) | PtRh8 meshes + PdNi5 meshes |
| Selectivity of conversion from ammonia to nitrogen oxide: | 95.5–96% |
| N$_2$O output: | 1,000–1,200 ppm |
| Example 2 (Comparison Example) | PtRh8 meshes + PdRh1.5 meshes |
| Selectivity of conversion from ammonia to nitrogen oxide: | 95.5–96% |
| N$_2$O output: | 1,000–1,200 ppm |
| Example 3 (Comparison Example) | PtRh8 meshes + PdRh5 meshes |
| Selectivity of conversion from ammonia to nitrogen oxide: | 94.5–95% |
| N$_2$O output: | 900–1,200 ppm |
| Example 4 (Invention) | PtRh8 meshes + PdRh3 meshes |
| Selectivity of conversion from ammonia to nitrogen oxide: | 95.5–96% |
| N$_2$O output: | 300–500 ppm |
| Remark: Pd meshes mechanically very weak after use. Cracks were present. | |
| Example 5 (Invention) | PtRh8 meshes + PdRh3Pt5 meshes |
| Selectivity of conversion from ammonia to nitrogen oxide: | 95.5–96% |
| N$_2$O output: | 300–500 ppm |
| Remark: Pd meshes mechanically very weak after use, but no cracks present. | |
| Example 6 (Invention) | PtRh8 meshes + PdRh3Pt15 meshes |
| Selectivity of conversion from ammonia to nitrogen oxide: | 95.5–96% |
| N$_2$O output: | 300–500 ppm |
| Remark: Pd meshes mechanically stable after use, but no cracks present. | |

2.1. Experiments in the Industrial Reactor

| System Data: | |
|---|---|
| reactor: | industrial system with two parallel reactors; |
| reactor pressure: | 4.8 bars; |
| load: | 11.2 tN/m$^2$day; |
| temperature: | 880° C.; |
| running time: | 180 days. |
| Reactor 1 (Standard System) | PtRh5 meshes + PdNi5 meshes |
| Converstion of ammonia To nitrogen oxide: | 95% |
| N$_2$O output: | 1,500 ppm |
| Reactor 2 (Invention) | PtRh5 meshes + PdPt15Rh2.5 meshes |
| Conversion of ammonia To nitrogen oxide: | 95% |
| N$_2$O output: | 1,000 ppm |

2.2. Experiments in the Industrial Reactor

| System Data: | |
|---|---|
| reactor: | industrial reactor; |
| reactor pressure: | 3.5 bars |
| load: | 5.85 tN/m$^2$day; |
| temperature: | 860° C.; |
| run time: | 300 days. |
| Example 1 (Standard System) | PtRh5 meshes + PdNi5 meshes |
| Converstion of ammonia To nitrogen oxide: | 94–96% |
| N$_2$O output: | 1,200–1,600 ppm |
| Example 2 (Invention) | PtRh5 meshes + PdPt15Rh3 meshes |
| Conversion of ammonia To nitrogen oxide: | 94–96% |
| N$_2$O output: | 400–800 ppm |

What is claimed is:

1. A process for reducing nitrous oxide which is formed during catalytic combustion of ammonia and oxygen to form nitrogen oxides, comprising the step of catalytically combusting ammonia and oxygen to form nitrogen oxides in a catalyst system having at least one first catalyst mesh element and at least one second catalyst mesh element, the at least one first catalyst mesh element including a platinum-rhodium mesh, the at least one second, downstream catalyst mesh element including a palladium-rhodium mesh with at least 92 wt. % palladium, 2–4 wt. % rhodium, and a remainder platinum.

2. A process according to claim 1, including separating the palladium-rhodium mesh element from the platinum-rhodium mesh element by at least one third mesh element.

3. A process according to claim 2, wherein the third mesh element consists of a heat-resisting steel.

4. A process for reducing nitrous oxide which is formed during catalytic combustion of ammonia and oxygen to form nitrogen oxides, comprising the step of catalytically combusting ammonia and oxygen to form nitrogen oxides in a catalyst system having at least one first catalyst mesh element and at least one second catalyst mesh element, the at least one first catalyst mesh element including a platinum-rhodium mesh, the at least one second, downstream catalyst mesh element including a palladium-rhodium mesh with 82–83 wt. % palladium, 2.5–3.5 wt. % rhodium, and a remainder platinum.

5. A process according to claim 4, wherein the palladium-rhodium mesh has a rhodium content of 2.5–3 wt % and a palladium content of 82.5 wt. %.

6. A process according to claim 4, including separating the palladium-rhodium mesh element from the platinum-rhodium mesh element by at least one third mesh element.

7. A process according to claim 6, wherein the third mesh element consists of a heat-resisting steel.

8. A device for reducing nitrous oxide which is formed during catalytic combustion of ammonia and oxygen to form nitrogen oxides, comprising a catalyst system having at least one first catalyst mesh element and at least one second catalyst mesh element for the catalytic combustion of ammonia and oxygen to form nitrogen oxides, the at least one first catalyst mesh element including a platinum-rhodium mesh, the at least one second, downstream catalyst mesh element including a palladium-rhodium mesh with at least 92 wt. % palladium, 2–4 wt. % rhodium, and a remainder platinum.

9. A device according to claim 8, and further comprising a third mesh element arranged so as to separate the palladium-rhodium mesh element from the platinum-rhodium mesh element.

10. A device according to claim 9, wherein the third mesh element is made of a heat-resisting steel.

11. A device for reducing nitrous oxide which is obtained during catalytic combustion of ammonia and oxygen to form nitrogen oxides, comprising a catalyst system having at least one first catalyst mesh element and at least one second catalyst mesh element for the catalytic combustion of ammonia and oxygen to form nitrogen oxides, the at least one first catalyst mesh element including a platinum-rhodium mesh, the at least one second, downstream catalyst mesh element including a palladium-rhodium mesh with 82–83 wt. % palladium, 2.5–3.5 wt. % rhodium, and a remainder platinum.

12. A device according to claim 11, wherein the palladium-rhodium mesh has a rhodium content of 2.5–3 wt. % and a palladium of 82.5 wt. %.

13. A device according to claim 11, and further comprising a third mesh element arranged so as to separate the palladium-rhodium mesh element from the platinum-rhodium mesh element.

14. A device according to claim 13, wherein the third mesh element is made of a heat-resisting steel.

\* \* \* \* \*